2,962,441

ALKALI FUSION PRODUCTS OF CYCLOHEXENONES IN LUBRICANT MANUFACTURE

Arnold J. Morway, Clark, and Jeffrey H. Bartlett, New Providence, N.J., assignors to Esso Research and Engineering Company, a corporation of Delaware No Drawing. Filed May 23, 1957, Ser. No. 661,004

6 Claims. (Cl. 252—39)

This invention relates to alkali fusion products of unsubstituted and substituted 2-cyclohexenones, the process of manufacture of said products, and their use in lubricants. The invention also relates to lubricating oil compositions containing mixed-salt complexes comprising metal salts of fatty acid and metal salts of acid derived from the alkali fusion of unsubstituted or alkyl substituted 2-cyclohexenones.

It has now been found that valuable products for lubricant manufacture may be obtained by fusing 2-cyclohexenones at high temperatures with caustic alkali, using about 1.00 to 1.50 moles of alkali per mole of the 2-cyclohexenones. During the fusion reaction, the ring is apparently broken between the carbonyl group and the double bond of the 2-cyclohexenone material to thereby form a salt of an aliphatic acid. The salt may be utilized directly in lubricating oils. However, by forming mixed salt complexes of the salts of fatty acid and salts of the aliphatic acid produced by said fusion process and incorporating the complex material into lubricating oils, lubricants of outstanding utility are formed.

The 2-cyclohexenones which may be used in the present invention have the general formula:

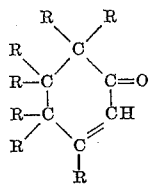

wherein each R may be hydrogen or an alkyl radical containing 1 to 3, preferably 1, carbon atoms. Specific examples of such compounds include: 2-cyclohexenone; 3,5,5-trimethyl-2-cyclohexenone (isophorone); 3,4,5,5,6-pentamethyl-2-cyclohexenone; 3-methyl-6,6-dipropyl-2-cyclohexenone; 4-ethyl-2-cyclohexenone, etc. Isophorone is particularly preferred.

The alkali fusion of the 2-cyclohexenone type material may be carried out as follows: Alkali metal oxides or alkali metal hydroxides such as sodium hydroxide or potassium hydroxide, preferably in flake or pellet form, are dispersed in an inert mineral oil menstruum. The mixture is heated to about 450 to 700° F., e.g. 525 to 625° F., whereupon the 2-cyclohexenone type material may be slowly added either in increments or continuously over a period of about 1 to 15 hours, e.g. 1 to 5 hours, while vigorously stirring and maintaining a reaction temperature of about 450 to 700° F., e.g. 525 to 625° F. After all the 2-cyclohexenone type material has been added, heating at these temperatures is continued for about 1 to 10, e.g. 1 to 3 hours, or until the desired conversion is obtained. The reaction mixture is then cooled and water is added. The mixture may then be extracted with a light hydrocarbon solvent, such as heptane or the like, in order to remove the mineral oil and unreacted 2-cyclohexenone material. The aqueous phase is separated and acidified with a mineral acid such as hydrochloric acid to form an organic aliphatic acid. The organic acid may then be removed from the aqueous phase by extraction with a light hydrocarbon solvent such as heptane and finally a crude organic acid is obtained by evaporation of the hydrocarbon solvent. While the crude material may be directly utilized without further purification, it may be purified by vacuum distillation. However, the organic acid is unstable and during distillation it apparently forms an inner ester or lactone. But when hydrolyzed, the lactone reverts to its acid form.

The fusion product in any of its forms, i.e. the sodium or potassium salt formed by the fusion reaction, the crude acid or the lactone, may be utilized to form mixed-salt complexes comprising salts of fatty acid and salts of the aliphatic acid formed from the alkali fusion. Such complexes will comprise about 2 to 75, e.g. 5 to 75 moles of low molecular weight fatty acid per mole of fusion acid and about 0.05 to 5.0, e.g. 0.05 to 1.0 mole of intermediate or high molecular weight fatty acid per mole of the fusion acid. Either fluid lubricants or greases may be prepared containing 0.1 to 40.0 weight percent, e.g. 3 to 35 weight percent of the complex, said weight percent being based on the total weight of the composition.

Suitable low molecular weight acids include saturated and unsaturated, substituted and unsubstituted aliphatic mono- and polycarboxylic acids having about 1 to 6 carbon atoms. These acids include fatty acids such as formic, acetic, propionic, furoic, acrylic, adipic and similar acids including their hydroxy derivatives such as lactic acid, etc. Acetic acid is preferred. Mixtures of these low molecular weight acids may be employed if desired.

Intermediate molecular weight fatty acids which may be used include those aliphatic, saturated or unsaturated, unsubstituted, monocarboxylic acids containing 7 to 12 carbon atoms per molecule, e.g. capric, caprylic, nonanoic, lauric acid, etc.

The high molecular weight fatty acids or aliphatic monocarboxylic acids useful for forming the complexes of the invention include naturally-occurring or synthetic, substituted or unsubstituted, saturated or unsaturated, mixed or unmixed fatty acids having about 13 to 30, e.g. 16 to 24 carbon atoms per molecule. Examples of such acids include myristic, palmitic, stearic, hydroxy stearic, such as 12-hydroxy stearic, di-hydroxy stearic, poly-hydroxy stearic and other saturated hydroxy fatty acids, arachidic, oleic, ricinoleic, hydrogenated fish oil, tallow acids, etc.

The metal component of the complex thickeners of this invention may be any metal used to form grease thickeners but preferably is an alkali metal such as lithium, potassium, sodium or an alkaline earth metal such as calcium, strontium, barium and magnesium. Mixtures of the grease-forming metals may be employed if desired. The metals are usually reacted with the acids in the form of metal bases, such as hydroxides, oxides, carbonates, etc.

The lubricating oil used in the compositions of the invention may be either a mineral lubricating oil or a synthetic lubricating oil. Synthetic lubricating oils which may be used include esters of dibasic acids (e.g. di-2-ethyl hexyl sebacate), esters of glycols (e.g. $C_{13}$ oxo acid diester of tetraethylene glycol), complex esters (e.g. the complex ester formed by reacting one mole of sebacic acid with two moles of tetraethylene glycol and two moles of 2-ethyl-hexanoic acid), halocarbon oils, alkyl silicates, sulfite esters, mercaptans, formals, polyglycol type synthetic oils, etc., or mixtures of any of the above in any proportions.

Various other additives may also be added to the lubricating composition (e.g. 0.1 to 10.0 weight percent)

of detergents such as calcium petroleum sulfonate; oxidation inhibitors such as phenyl alpha naphthylamine; corrosion inhibitors, such as sorbitan monooleate; dyes; other grease thickeners, and the like.

The lubricating compositions of the invention will generally be prepared by coneutralizing the fatty acids and the fusion product in a lubricating oil menstruum by the addition of a sufficient amount of alkali metal base or alkaline earth metal base, followed by heating to a temperature of about 400 to 700° F., e.g. 500 to 600° F., until the complex thickener has been formed, say about ½ to 2 hours. The mixture may then be cooled to about 150 to 200° F., where any additives may be added. The grease may then be homogenized such as by passing it through a Gaulin homogenizer or a Charlotte mill, followed by subsequent cooling to room temperature. The complex may also be formed by heating the preformed salts in an oil medium to complexing temperatures.

Where the metal component of the complex is sodium or potassium, then the alkali fusion of the 2-cyclohexenone type material may be carried out in situ in the mineral oil with the other complex forming materials present. In this manner, it is possible to eliminate the steps of forming and separating the acid derived from the cyclohexenone material. This is preferably carried out by dispersing the fatty acids and the 2-cyclohexenone material in the lubricating oil, adding the alkali, preferably in the form of a 40 to 50 percent aqueous solution, and heating to about 250 to 300° F., until the fatty acids are converted to soaps and salts and all the water is volatilized. The alkali fusion and complexing step is then carried out by further heating to about 450 to 700° F., e.g. 500 to 600° F. until hydrogen evolution substantially ceases, e.g. about ½ to 2 hours. The lubricant may then be cooled and finished.

The invention will be further understood by the following examples, which include preferred embodiments of the invention.

EXAMPLE I

*Preparation of the alkali fusion product of isophorone*

The fusion was carried out in a one-gallon nickel reactor with a stainless steel cover which was fitted with a stirrer, thermometer well, condenser and a feed line attached to a dropping funnel. The exit from the condenser was attached to two wash bottles and then to a wet test meter for measuring the amount of hydrogen evolved during the reaction. The reactor was charged with:

|   | Grams |
|---|---|
| Primol D (a heavy white oil) | 400 |
| NaOH flakes | 555 |
| KOH flakes | 500 |

This mixture was heated to 300° C., then 1282 grams of isophorone were added gradually over a period of one hour, while the temperature was maintained at 300 to 310° C. After all the isophorone was added, the 300 to 310° C. temperature was maintained for another hour. During the entire time of the reaction a total of 3.3 cubic feet of hydrogen was evolved, as measured by the wet test meter. The reactor was then allowed to cool to 280° C. and water was slowly added until a total of 8 liters of water had been added. The resulting mixture was then extracted twice with petroleum ether (a light naphtha comprising mainly pentane and hexane) to remove the white oil and unreacted isophorone. The remaining aqueous phase was acidified with concentrated hydrochloric acid and then extracted with petroleum ether. The extract was then heated to evaporate the petroleum ether whereby a residue of 1,005 grams of crude acid was obtained. A 997 gram portion of the crude acid was distilled through a 12 inch packed column at 50 mm./Hg pressure using a 5/1 reflux ratio. A heart cut of 590 grams of acid was taken having a boiling point at atmospheric pressure of 145 to 147° C. This cut had the following inspections:

| Molecular weight | 156 (as determined by a mass spectrometer). |
|---|---|
| Bromine number | 2.2 cgs. $Br_2$/gm. |
| Neutralization number | 7.92 mg. KOH/gm. |
| Saponification number | 352.8 mg. KOH/gm. |
| Free carbonyl | Less than 0.1 mg. KOH/gm. |

The above inspections indicated that an unsaturated acid salt had been formed by the fusion reaction which salt had remained in the aqueous layer during extraction. However, on acidification, the acid which was liberated apparently formed a lactone which had a very low bromine number and a low neutralization number. A portion of the lactone was used to prepare a lubricant as follows.

*Lubricant preparation*

A fluid lubricant was prepared having the following formulation:

| Glacial acetic acid | percent | 12.0 |
|---|---|---|
| Hydrofol acid 51 | do | 1.0 |
| Lactone obtained by distillation of crude acid product | do | 5.0 |
| Hydrated lime | do | 9.8 |
| Phenyl alpha naphthylamine | do | 1.0 |
| Mineral oil (55 SSU at 210° F.) | do | 71.2 |

Mole ratio of acetic/fusion product—63:1
Mole ratio of hydrofol acids/fusion product—0.11:1

The lime was intimately dispersed in the mineral oil in a fire-heated kettle. Then a blend of the acetic acid, the lactone and hydrofol acid 51 (hydrogenated fish oil acids corresponding in degree of unsaturation and acid number to commercial stearic acid) was added to the dispersion and the mixture stirred for ½ hour. The mixture was then heated to a temperature of 460° F. over a period of approximately 1 hour. The heat was then turned off, the mixture was stirred while cooling to 200° F. at a rate of 5° F./minute. At this point phenyl alpha naphthylamine was added, the mixture was further cooled to 150° F., at which temperature it was passed through a Gaulin homogenizer operating at 6,000 p.s.i. shear. The grease prepared above had the following properties:

*Properties*

Appearance—Excellent, smooth, uniform.
Consistency — Semi-fluid — Slight thixotropic set on quiescence.
Water resistance—Excellent.
Solubility in boiling water—Nil.
E.P. properties—Almen test:
  Weights carried gradual loading—15.
  Pin condition—Excellent.
4-ball wear test scar diameter (1800 r.p.m.—10 kg. load—75° C.—1 hour)—0.20 mm.
Norma Hoffmann oxidation:
  Hours to 5 p.s.i. drop—395.
Spread test on hot plate (900° F.)—None.

As seen from Example I, an excellent semi-fluid lubricant was obtained which was slightly thixotropic and had excellent load carrying ability.

To further illustrate the invention, a solid grease was prepared by carrying out together both the fusion and complex salt formation in situ.

EXAMPLE II

| Formulation | Wt. percent |
|---|---|
| Glacial acetic acid | 4.0 |
| Isophorone | 10.0 |
| Hydrofol acid 51 | 10.0 |
| Sodium hydroxide | 6.5 |
| Phenyl α naphthylamine | 1.0 |
| Mineral oil (55 SSU at 210° F.) | 68.5 |

Mole ratio of acetic acid to isophorone—9.2:1.
Mole ratio of hydrofol acid to isophorone—0.5:1.

Preparation

To a fire-heated kettle equipped with efficient means of stirring, the isophorone, hydrofol acid 51 and mineral oil were charged and warmed to 150° F. When all the acids had melted, the acetic acid was charged followed immediately by a 40 percent aqueous solution of the sodium hydroxide. Heating was continued to 400° F. where the mass was dehydrated and the acids neutralized. Heating was continued to 510° F. and held at this temperatures until foaming ceased after 30 minutes (the foaming was caused by evolution of hydrogen), and when this evolution had ceased, it indicated completion of the fusion of the isophorone. The product was then cooled to 200° F. where the phenyl α naphthylamine was added. The grease was further cooled to 150° F. where it was then passed through a Gaulin homogenizer operating at 5,000 p.s.i.

Properties

Appearance—Excellent, smooth, uniform product.
Percent free alkalinity (as NaOH)—0.90.
Dropping point, ° F.—500+.
Penetrations 77° F. mm./10:
   Unworked—340.
   Worked 60 strokes—325.
   Worked 100,000 strokes—310.
Water solubility:
   Up to 150° F.—Insoluble.
   Over 150° F.—Soluble.
Norma Hoffmann oxidation:
   Hours to 5 p.s.i. drop in oxygen pressure—340.
Lubrication life, hours [1]:
   250° F.—10,000 r.p.m.—2432.

[1] Anti-friction bearing manufacturers—National Lubricating Grease Institute's test machine.

Example II illustrates both the formation of a solid lubricant and the carrying out of the fusion reaction directly in the oil which constitutes a portion of the final lubricant.

What is claimed is:

1. A process for preparing a lubricating composition which comprises dispersing in a major proportion of lubricating oil, (a) a mixture of from 2 to 75 molar proportions of a $C_1$ to $C_6$ fatty acid, 0.05 to 5.0 molar proportions of a $C_6$ to $C_{30}$ fatty acid, and one molar proportion of a lactone prepared by (1) alkali fusion at hydrogen evolving temperature in an inert medium of a material having the formula:

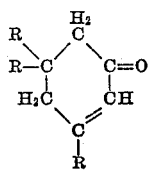

wherein each R is selected from the group consisting of hydrogen and alkyl groups containing 1 to 3 carbon atoms, (2) adding water to the product obtained by alkali fusion, (3) acidifying the aqueous phase, and (4) vacuum distilling said aqueous phase, and (b) a metal base selected from the group consisting of alkali and alkaline earth metal bases sufficient to neutralize said mixture; and heating the dispersion of metal base, fatty acids and lactone in said oil to a temperature of about 400° to 700° F. for about ½ to 2 hours and allowing said composition to cool.

2. A process according to claim 1, wherein said material is isophorone.

3. A process according to claim 1, wherein said composition is a fluid lubricant.

4. A process according to claim 1, wherein said composition is a grease.

5. A process for the preparation of a lubricant which comprises dispersing in lubricating oil fatty acid and a material having the formula:

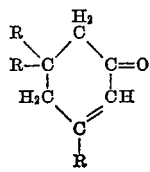

wherein each R is an alkyl group of 1 to 3 carbon atoms, adding to said dispersion a material selected from the group consisting of alkali metal hydroxides and alkali metal oxides, in an amount sufficient for fusion and saponification, heating to a temperature of about 450° F. to 700° F., continuing said heating until gas evolution ceases, then cooling to obtain said lubricant.

6. A process according to claim 5, wherein said fatty acid comprises in a molar proportion about 2 to 75 moles of a $C_1$ to $C_6$ fatty acid and about 0.05 to 5.0 moles of a $C_6$ to $C_{30}$ fatty acid per mole of said material.

References Cited in the file of this patent
UNITED STATES PATENTS

| | | |
|---|---|---|
| 2,255,421 | Groll et al. | Sept. 9, 1941 |
| 2,390,576 | Farlow et al. | Dec. 11, 1945 |
| 2,695,313 | Toland | Nov. 23, 1954 |
| 2,801,973 | Morway et al. | Aug. 6, 1957 |
| 2,801,974 | Morway et al. | Aug. 6, 1957 |
| 2,850,458 | Beerbower et al. | Sept. 2, 1958 |